(12) United States Patent
Kartalov

(10) Patent No.: US 12,355,123 B2
(45) Date of Patent: Jul. 8, 2025

(54) T-CHANNEL MICROFLUIDIC DEVICES AND 3D PRINTING METHODS FOR PRODUCING T-CHANNEL MICROFLUIDIC DEVICES

(71) Applicant: THE UNITED STATES OF AMERICA, AS REPRESENTED BY THE SECRETARY OF THE NAVY, Arlington, VA (US)

(72) Inventor: Emil Paskalev Kartalov, Pacific Grove, CA (US)

(73) Assignee: The Government of the United States of America, as represented by the Secratary of the Navy, Arlington, VA (US)

( * ) Notice: Subject to any disclaimer, the term of this patent is extended or adjusted under 35 U.S.C. 154(b) by 412 days.

(21) Appl. No.: 17/878,729

(22) Filed: Aug. 1, 2022

(65) Prior Publication Data

US 2023/0318000 A1   Oct. 5, 2023

Related U.S. Application Data

(60) Provisional application No. 63/227,932, filed on Jul. 30, 2021.

(51) Int. Cl.
| | | |
|---|---|---|
| *H01M 8/16* | (2006.01) | |
| *B33Y 40/20* | (2020.01) | |
| *B33Y 80/00* | (2015.01) | |
| *B33Y 10/00* | (2015.01) | |

(52) U.S. Cl.
CPC .............. *H01M 8/16* (2013.01); *B33Y 40/20* (2020.01); *B33Y 80/00* (2014.12); *B33Y 10/00* (2014.12)

(58) Field of Classification Search
CPC ......... B33Y 10/00; B33Y 40/20; B33Y 80/00; H01M 8/16
See application file for complete search history.

(56) References Cited

U.S. PATENT DOCUMENTS 10,895,544 B2 *   1/2021   Molla ................... G01N 21/05

OTHER PUBLICATIONS

Nguyen, Tricia, Output power optimization of microbial fuel cells by scalable microfluidic devices, Dec. 2019 (Year: 2019).*
S.M. Mirvakili and I.W. Hunter, Advanced Materials 30 (6), 1704407 (2018).

(Continued)

*Primary Examiner* — Victoria H Lynch
(74) *Attorney, Agent, or Firm* — Heber Martin Carbajal Chavez; Scott Bell

(57) ABSTRACT

This disclosure, and the exemplary embodiments provided herein, include microfluidic devices and methods of producing microfluidic devices including 3D-printable structures which are scalable, robust, parallel, fast, and efficient for generating vast networks of electrodes in-situ. For example, benthic microbacterial fuel cells including networks of electrodes to harvest electrons ejected from bacteria positioned in a complex multilevel structure containing those bacteria suspended in aqueous solution or feeding medium. In addition to biofuel cells, the use of 3D-printed T channels as disclosed extends to other applications where similar networks of conducting channels can be rapidly and efficiently generated in existing structures.

18 Claims, 10 Drawing Sheets

(56) References Cited

OTHER PUBLICATIONS

J. Zhang, J. Sheng, C.T. O'Neill, C.J. Walsh, R.J. Wood, J.H. Ryu, J.P. Desai, and M.C. Yip, IEEE Transactions on Robotics, 35 (3), p. 761 (2019).

S.V. Ebadi, D. Semnani, H. Fashandi, and B. Rezaei, Polymers for Advanced Technologies, 30 (9) 2261-2274 (2019).

H. Imamura, K. Kadooka, and M. Taya, Electroactive Polymer Actuators and Devices, 10163 (2017).

Y. Bahramzadeh and M. Shahinpoor, Soft Robot 1 (1), pp. 38-52 (2014).

\* cited by examiner

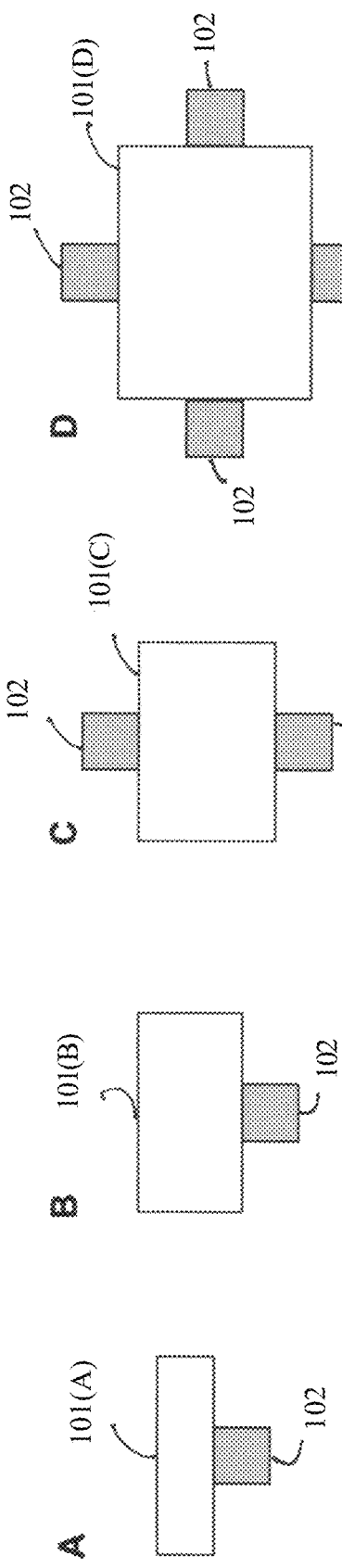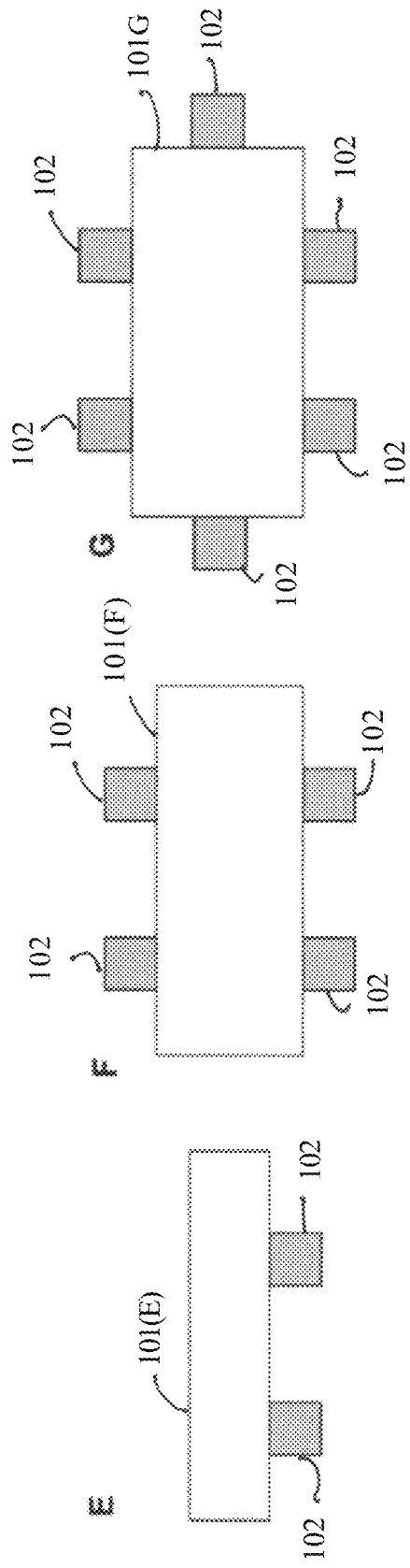

T-CHANNEL MICROFLUIDIC DEVICES AND 3D PRINTING METHODS FOR PRODUCING T-CHANNEL MICROFLUIDIC DEVICES

CROSS REFERENCE TO RELATED PATENT(S) AND APPLICATION(S)

This application claims the benefit of U.S. Provisional Application No. 63/227,932, filed Jul. 30, 2021, and entitled T-CHANNEL ARCHITECTURES FOR SCALABLE SELF-ASSEMBLED NETWORKS OF ELECTRODES FOR 3D-PRINTABLE ELECTRICAL DEVICES, which is hereby incorporated in its entirety by reference.

BACKGROUND

Emerging applications involving 3D-printable structures require a scalable, robust, parallel, fast, and efficient method of generating vast networks of electrodes in-situ. For example, benthic microbacterial fuel cells require networks of electrodes to harvest electrons ejected from the bacteria positioned in a complex multilevel structure containing those bacteria suspended in aqueous solution or feeding medium. Herein disclosed is an innovative solution for the generation of such electrode networks, through use of 3D-printed channels of particular architectures. The disclosed devices and methods of producing the disclosed devices is immediately relevant to biofuel cells, but its significance extends to any situation or application where similar networks of conducting channels must be rapidly and efficiently generated in existing structures.

Large fleets of drones, including unmanned underwater vehicles (UUVs) and sensors, promise to cover a large area of monitoring and control at a fraction of the cost of traditional assets, with significantly reduced logistics tail, and decreased risks for human personnel. However, such fleets can pose their own logistics challenges. One problem for UUVs is that each one has to be charged on a regular basis due to high levels of water resistance and distance of travel. Without a local power source, charging these UUVs could take a lot of time and risk security issues if all UUVs are charged at once in one place.

Benthic microbial fuel cell (BMFC) technology could act as a local power source. A microbial fuel cell is a bio-electrochemical system that employs facultative or strict anaerobic bacteria to oxidize organic matter and produce direct electrical current. A BMFC uses indigenous bacteria that live in the sediment of the ocean floor. As a result of their natural life processes, these anaerobic microorganisms expel electrons. The expelled charge can be recovered and run through a load connected to a cathode where oxygen in the seawater captures the terminal electron. The outcome is electrical power generated from the bacteria. BMFCs have been shown to produce meaningful power to sensors, however the average output power density is relatively low, e.g. 10-40 mW/m2. Macroelectrodes may have low capture efficiency due to large average distances between the electrode and cells in current macrosystems such as seawater. Thus, shrinking the distance could improve the efficiency by a significant factor. Elastomeric microfluidic chips may be used as the enabling technology to shrink the distance between the electrode and cells. Further optimization and study of the system may lead to alternative architectural, scaling, biological, and biochemical parameters, which could significantly improve the output power density and lead to the development of an optimized power unit. Arraying that unit would produce renewable power stations. Since a need still exists for powering UUVs, utilizing arrayed microfluidic microbacterial fuel cell chips may be a potential solution.

This disclosure, and the exemplary embodiments described herein, describe T-channel microfluidic devices and 3D printing methods to produce these devices. While the exemplary embodiments described are related to microfluidic microbial fuel cells, it is to be understood that the scope of this disclosure is not limited to such application.

INCORPORATION BY REFERENCE

The following publications are incorporated by reference in their entirety.

U.S. 2021/0104767, patent application Ser. No. 16/989,963, filed Aug. 11, 2020, and entitled MICROFLUIDIC MICRBACTERUAL FUEL CELL CHIPS AND RELATED OPTIMAZATION METHODS.

Nguyen et al., Journal of Environmental and Chemical Engineering, 2021.

BRIEF DESCRIPTION

In accordance with one embodiment of the present disclosure, disclosed is a microfluidic device structure comprising: a microfluidic device body; a plurality of channels within the microfluidic device body, wherein each channel has a T-shaped cross-section, each channel including a top wide section and a bottom narrow section, the top wide section associated with the top of the T-shaped cross section and the bottom narrow section associated with the bottom of the T-shaped cross section, wherein the top wide section has less fluidic resistance relative to a fluidic resistance of the bottom narrow section; a fluidic inlet operatively associated with the microfluidic device body and plurality of channels; and a fluidic outlet operatively associated with the microfluidic device body and the plurality of channels.

In accordance with another embodiment of the present disclosure, disclosed is a method of producing a microfluidic device structure comprising: a) 3D printing a monolithic microfluidic device body including a plurality of channels, a fluidic inlet and a fluidic outlet within the microfluidic device body, wherein each channel has a T-shaped cross-section, each channel including a top wide section and a bottom narrow section, the top wide section associated with the top of the T-shaped cross section and the bottom narrow section associated with the bottom of the T-shaped cross section, wherein the top wide section has less fluidic resistance relative to a fluidic resistance of the bottom narrow section; and b) preferentially filling the plurality of channels based on surface tension and self-assembly, the bottom narrow section of each channel filled with a first material, and the top wide section of each channel filled with a second material distinct from the first material.

In accordance with another embodiment of the present disclosure, disclosed is a microbial fuel cell device comprising: a monolithic 3D printed microfluidic device body; a plurality of channels within the microfluidic device body, wherein each channel has a T-shaped cross-section, each channel including a top wide section and a bottom narrow section, the top wide section associated with the top of the T-shaped cross section and the bottom narrow section associated with the bottom of the T-shaped cross section, wherein the top wide section has less fluidic resistance relative to a fluidic resistance of the bottom narrow section; a fluidic inlet operatively associated with the microfluidic device body and plurality of channels; and a fluidic outlet operatively associated with the microfluidic device body and the plurality of channels.

BRIEF DESCRIPTION OF THE DRAWINGS

For a more complete understanding of the present disclosure, reference is now made to the following descriptions taken in conjunction with the accompanying drawings, in which:

FIG. 1A shows an empty microfluidic channel with T-shaped cross-section; FIG. 1B shows the hydrophobic surfaces filled with conducting hydrophobic fluid; FIG. 1C shows a hydrophilic aqueous solution fed into the microchannel at appropriate pressure, where the pressure is enough to overcome the fluidic resistance in the wide section of the channel but not in the narrow section, due to surface tension effects; FIG. 1D shows the aqueous solution replaced or evaporated.

FIGS. 2A-2G show cross-sections of examples of exemplary embodiments of the various T channel architectures, where FIG. 2A features wide and narrow channels of similar height; FIG. 2B features a deeper wider channel to accommodate more cells connecting to a common electrode; FIG. 2C features conducting channels on both sides and FIG. 2D features conducting channels or all sides, where multiple conducting channels provide improved electron capture efficiency or connectivity relative to a single conducting channel used with a relatively deep and wide working fluid channel as shown in FIG. 2B; FIG. 2E shows multiple conducting channels on a common side and FIG. 2F shows multiple conducting channels on multiple sides to accommodate relatively wide working fluid channels; and FIG. 2G shows a relatively complete connectivity solution on all sides for connectivity needs and dimensions of a wide channel according to an exemplary embodiment.

FIG. 3B illustrates details of the microfluidic channels.

FIG. 5A shows a 3D printed monolithic microbial fuel cell body which was 3D printed using a sacrificial wax to produce the T-channel; FIG. 5B shows the microbial fuel cell body during a sacrificial wax melt step; FIG. 5C shows the microbial fuel cell body during a bleaching step using 2% NaOH; and FIG. 5D shows the microbial fuel cell body after an air flush step.

DETAILED DESCRIPTION

Figures 1A, 1B, 1C, 1D:
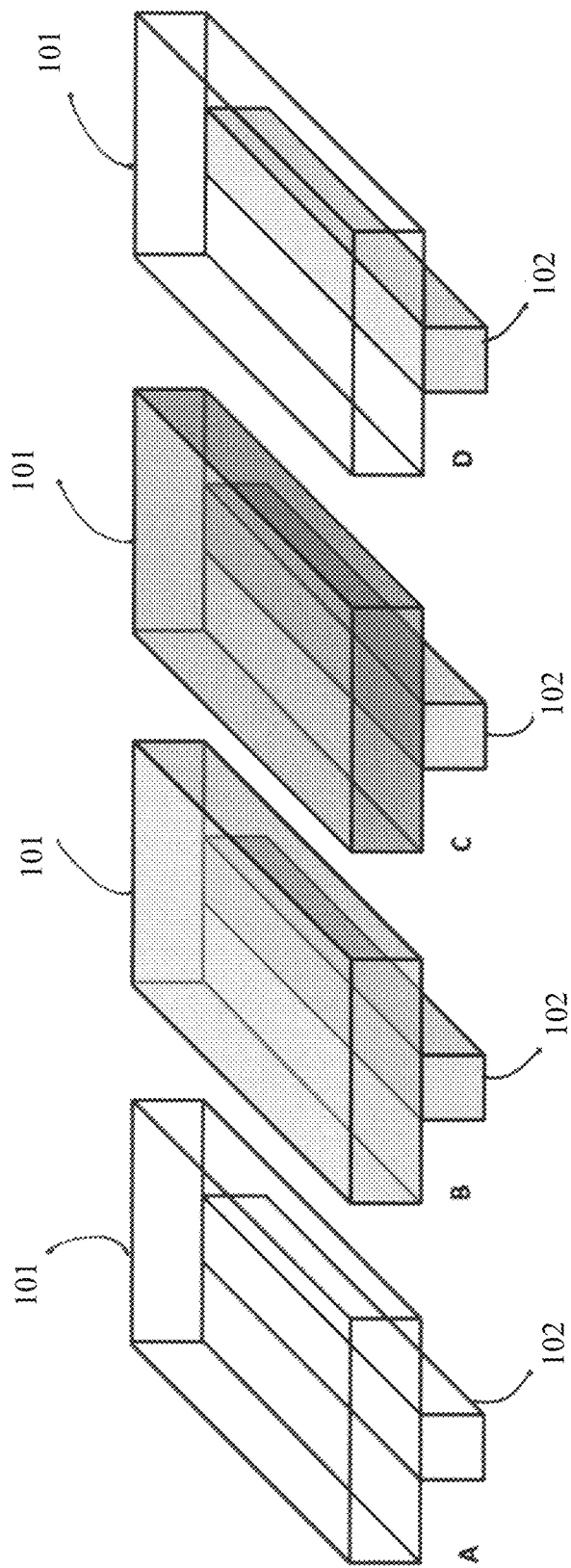
FIGS. 1A-1D show the steps involved to produce a T-channel microfluidic structure according to an exemplary embodiment of this disclosure.

There are a variety of emerging applications of 3D printing, wherein complex structures are built monolithically using a single material, e.g., 3D printer resin, while the application also requires the device to have a second material of different properties established in the same space. One potential solution is the 3D printing of hybrid structures, e.g., where both resin and a conducting material (e.g., metal) are deposited or defined simultaneously or iteratively during the print. However, such hybrid printing faces very serious challenges. For example, metal is 3D printed through sintering at much higher temperatures than 3D printer resins can sustain without being damaged. While these problems of hybrid printing may be solved in the future, the need for hybrid 3D printable devices remains.

The solution provided herein, and the exemplary embodiments described herein, are fundamentally based on 3D printing a microfluidic device monolithically using a single material, e.g., 3D printer resin or toner resin, and then defining the other material inside the created device by microfluidic and physical means. In particular, soft electrodes can be defined by an ionogel, or conducting gel, or a semi-liquid emulsion, e.g., one that contains metal microparticles, e.g., silver. Then the challenge is how to introduce the conducting fluid inside the device in a way that will retain the fluid in the desired areas within the device, but not retained in the rest of the areas.

In particular, research in biofuel cells is moving towards 3D printable devices, which accommodate power-generating bacteria. Those bacteria need to be in aqueous environments carrying appropriate nutrients. This can be accomplished by loading the bacteria in their carrier solution inside a network of microchannels within the 3D printed device, where the height of the channels forces the bacteria to be within a short distance of a network of electrodes, to maximize the capture efficiency of the ejected electrons.

Microbial fuel cells (MFC) employ facultative or strict anaerobic bacteria to oxidize organic matter and produce direct electrical current. A Benthic MFC (BMFC) uses indigenous bacteria that live in the sediment of the ocean floor. Marine sediment is teeming with microbial activity crucial to marine biogeochemistry. As part of their living processes, benthic bacteria expel electrons, which are collected by a capture anode. The charge then passes through a load to a cathode floating in the seawater column above. The voltage between the anode and the cathode typically ranges from 200 mV to 1 V and it can be used to extract power from the BMFCs.

BMFCs have been shown to produce power to small, low power sensors, such as to a magnetometer and autonomous sensors. However, the average output power density of in-situ units is relatively low, e.g., 3-40 mW/m2. Although, many microbial fuel cells in laboratory studies have demonstrated power generation on the order of 1000 mW/m2 and greater, these are usually in fed systems under optimum conditions. For units that are placed in sediments without membranes to better simulate the marine environment, some studies have improved power density by modification of the cathode, anode, or both. Others have explored different electrode spacing, various surface modification of carbon derived materials, such as carbon felt, and different organic additives, such as acetate, which have been found to boost MFC performance and other food sources, such as chitin.

Some parameters to optimize BMFC technology may include concentration of the bacteria, the geometry of the capture electrode, and the average spacing between the cells and the electrode. Although a higher cell density is expected to produce higher power output, due to the nature of microbiological systems requiring a balanced environment, beyond a certain concentration the system is likely to experience diminishing returns and perhaps even a decrease in output power.

Due to their size, most bacterial biofilms exist wholly within low Reynolds (Re) number regimes where viscous forces dominate. The Reynolds number is a dimensionless ratio in hydrodynamics which can indicate whether flow is expected to be laminar or turbulent. For bacteria in marine sediments, Re<1. Thus, bacterial movement is based on instantaneous forces (i.e., diffusion) within laminar regimes. Elastomeric microfluidic chips provide a platform that offers Re<1 environments complimentary to the typical microbial inhabitants. They are common in biotechnology, used for cell culture work, biomedical diagnostics, and embedded electric measurements.

The ability to combine elastomeric microfluidic chips with electrical measurements is well established and has already been shown to increase capabilities toward the characterization of microbial activity through fabricating metal electrodes on glass slides that serve as the substrate layer of the elastomeric chip. These capabilities present an enabling technology for a renewable bioelectrical power generation platform, where fluidic control in a non-toxic bacterial housing within microscale parameters is possible. It was hypothesized that power output may be accordingly improved by shortening the distance between the bacteria and the anode architecture.

U.S. 2021/0104767, patent application Ser. No. 16/989, 963, filed Aug. 11, 2020, and entitled MICROFLUIDIC MICRBACTERUAL FUEL CELL CHIPS AND RELATED OPTIMAZATION METHODS, describes the design and construction of microchips specifically developed for microbes present in marine sediment, with the specific goal to improve the capture efficiency of the electrons at the anode. A microfluidic chip was designed and developed that confined the bacteria to within 90 μm of the anode matrix to demonstrate improved BMFC performance utilizing microstructures as a proof-of-concept. The system geometries and experimental conditions may be optimized in future microscale test platforms to later extend to multiple arrays that could power small sensors underwater.

An issue associated with the demonstrated devices in U.S. 2021/0104767 is they are ultimately single-layer, in the sense that there is just one power-generating layer of bacteria. The prototypes are built by layering a microfluidic component on top of an electrode substrate. Since practical power stations would require perhaps tens of thousands of such layers, upscaling such geometries in the traditional way would be prohibitively expensive and thus impracticable. On the other hand, manufacturing scalable devices can be solved if the device can be 3D printed. The microfluidic component can be 3D printed readily, but the electrode cannot be as yet printed at the same time in the same device.

This disclosure, and the exemplary embodiments described herein, provide a scalable 3D printed microfluidic component where electrodes are produced within a bottom relatively narrow channel of an overall T channel fluidic architecture.

The basic idea is that initially a microfluidic structure is 3D printed and then a liquid conductive material is fed inside the 3D printed microfluidic structure via inlet/outlet ports. Normally, this process would fill up the channels completely, leaving no room for the bacterial solutions. Feeding in the bacterial solution would simply wash off the liquid electrode, defeating the purpose. So, to circumvent this problem, each channel in the device is patterned to have a cross-section in the shape of the letter T. The fundamental idea is that the T channel has two sections of different widths (FIG. 1A). This disclosure uses the terms top, wide, and top wide section to refer to the wider channel section of the T channel, and the terms bottom, narrow and bottom narrow section to refer to the relatively narrower channel section of the T channel. In the context of a microbial fuel cell, the bottom narrow section of the T channel includes a conductive material which provides an electrode for capturing of electrons from a working fluid present in the top wide section of the T channel.

These sections the top and bottom, have different fluidic resistance. In essence the T channel functions as two parallel channels of different fluidic resistance. The fluidic resistance differential combines with surface tension phenomena to form the physical basis of the described devices and methods.

FIGS. 1A-1D show the basic steps of the disclosed procedure for the generation of a scalable network of electrodes according to an exemplary embodiment of this disclosure.

Initially, the overall or body of a microfluidic device is 3D printed using a hydrophobic resin. The result is a microfluidic device with a network of empty channels defined within the device. FIG. 1A shows the contours of a cross-section of the channel. Notably, the cross-section of the microchannel is T-shaped, where the channel contains a wide top section 101 and a relatively narrow bottom section 102 in immediate contact with the wide top section 101.

Then, as shown in FIG. 1B, the device T channel is completely filled with a conducting hydrophobic fluid, e.g., a warmed ionogel, metal microparticle gel, or microparticle emulsion suspension.

Next, as shown in FIG. 1C, an aqueous solution is fed into the T-channel containing the conducting hydrophobic fluid at a regulated pressure. The aqueous solution feed pressure is set sufficiently high, so that the T channel top wide section 101 of the channel is cleared, but low enough, so that the T channel bottom narrow section 102 conducting hydrophobic fluid remains intact. This result can be achieved because the T channel top wider section 101 has significantly lower fluidic resistance than the T channel bottom narrower section 102, whereby the top wider section 101 acts as a fluidic shunt, relative to the bottom narrower section 102, and the aqueous fluid flow passes through the top wide section 101 only and clears the previously fed conducting hydrophobic fluid from the T channel wide 101 section only. An alternative way to look at the structure is that surface tension in the T channel narrow section 102 is significantly higher than in the wide section 101, since the force generated by surface tension in a tube is stronger when the cross-sectional area of the tube is smaller. The T channel narrow section 102 offers significant counter-pressure based on surface tension, particularly as the conducting fluid and channel wall are hydrophobic, while the aqueous solution is hydrophilic. As a result, as shown in FIG. 1C, the wide section 101 is filled with the aqueous solution, while the narrow section 102 remains filled with the conducting fluid or gel.

At this point, an aqueous solution is used to flush out the conducting fluid from the T channel wide section 101 and replaced with a working aqueous solution needed for the particular application. For example, with benthic fuel cells, a working solution would be a suspension of the bacteria in feeding medium, salt water, or some combination thereof.

Alternatively, the flushing aqueous solution can be dried out from the T channel wide section 101, leaving the wide section empty and the narrow section 102 filled with liquid conducting fluid as shown in FIG. 1D. This procedure makes sense for long-term storage of prepared devices, where the definition and design of the network of electrodes is completed, but the ready devices need to be stored for some time before subsequent use. In other words, the result is a scalable, robust, in-situ definition of networks of electrodes, the channel later filled with a working aqueous solution as needed by a specific application.

If a conducting gel is used instead of a conducting fluid, the above procedure needs to be slightly modified. A heated gel is in liquid form but will solidify if cooled. So, a conducting gel heated to melting temperature can be fed into the devices described above, then flushed out with hot water, to maintain the gel in liquid form. Then the system can be allowed to cool down, which causes gelling, i.e., the gel solidifies. As a result, the conducting gel would solidify in the T channel narrow section 102 during the cooling process, while the water in the T channel wide section 101 can be flushed out or evaporated.

Further developments of the basic idea involve the number of narrow channels and their positioning within the wide channel. FIGS. 2A-2G 2 shows some of the possibilities.

The fundamental feature of the T-channel self-assembly microfluidic device disclosed herein is a T channel including a wide channel section 101(A) and a narrow channel section 102 as shown in FIG. 2A. Adequate capture distances, e.g., with biofuel cells, will dictate the actual dimensions, e.g., in terms of maximal distance between any point of the reservoir channel (i.e. the wide channel) and the conducting channel (i.e. the narrow channel). As a result, if the capture distance can be larger, then the wide channel 101(B) can be made deeper as shown in FIG. 2B. This has the advantage of harvesting relatively more electrical charge, as compared to the device shown in FIG. 2A, using a similar conducting channel arrangement.

On the other hand, if the T channel wide channel 101(C) requires a certain depth for a particular application and this required channel depth is too deep for the efficient capture of electrical charge using a singly electrical conducting channel as shown in FIG. 2A, one solution is to have conducting channels on opposing sides of a common wide channel as shown in FIG. 2C. Alternatively, another solution is to have conducting channels on all four sides of a common wide channel 101(D) as shown in FIG. 2D.

If for architectural reasons or reasons of efficient use of space, the wide channel 101(E) is too wide to be serviced by a single conducting channel, one solution is to incorporate multiple conducting channels on a single side of a wide channel as shown in FIG. 2E, thereby decreasing the maximal distance between charge-generating bacteria within the T channel wide section and the nearest electrode. This arrangement improves the capture efficiency of the charge and increases the effective power output of biofuel cells. If the wide channel shown in FIG. 2E is made relatively deeper as shown in FIG. 2F 101(F), multiple conducting channels can be arranged on the opposite side of the wide channel as well.

In the most general case, wide channel dimensions and the required maximal distance between bacteria and the nearest electrode can produce architectural proportions such that different solutions can be incorporated into the same structure. For example, as shown in FIG. 2G, excessive T channel top section width 101(G) can necessitate multiple conducting channels for one pair of sides, while moderate depth may do well with a single channel per respective side.

A good example of the above descriptions is about harvesting of charge from the wide sections and conducting it out of the device through the conducting material in the narrow sections 102. As another permutation, the opposite is possible and potentially useful as well. Namely, the same architectures can be used to do the opposite—transfer charge through the conducting material in the narrow sections 102 to a working fluid and material in the wide sections. Such applications can be chemical, biophysical, biomechanical, or biomimetic, and include, for example, some forms of artificial muscles and other actuators.

Figure 3A:
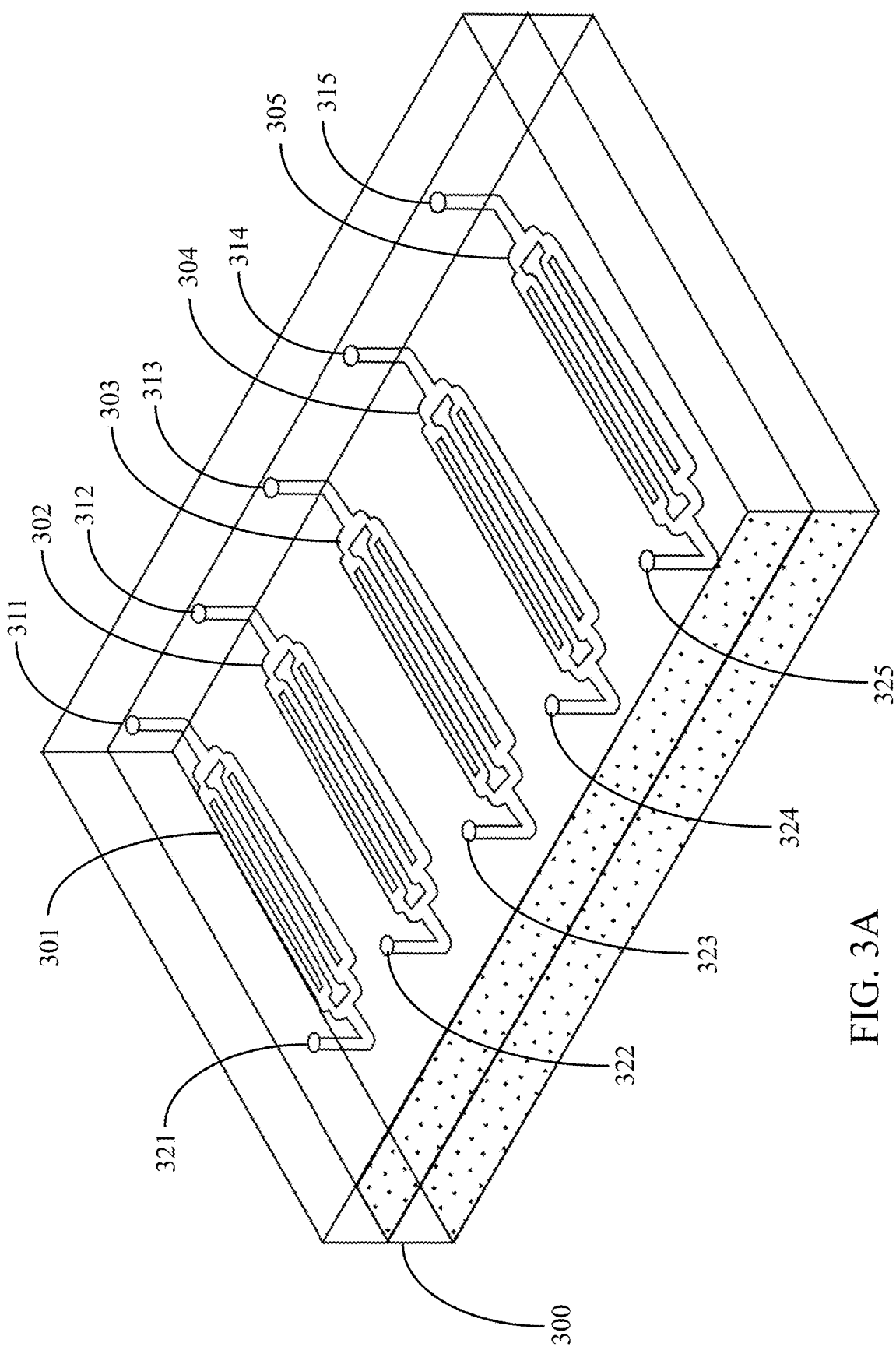
FIGS. 3A and 3B show a chip design for monolithic high-resolution 3D printing of a microfluidic device/microbial fuel cell device on an OBJET500 3D printer, where
Figure 3B:
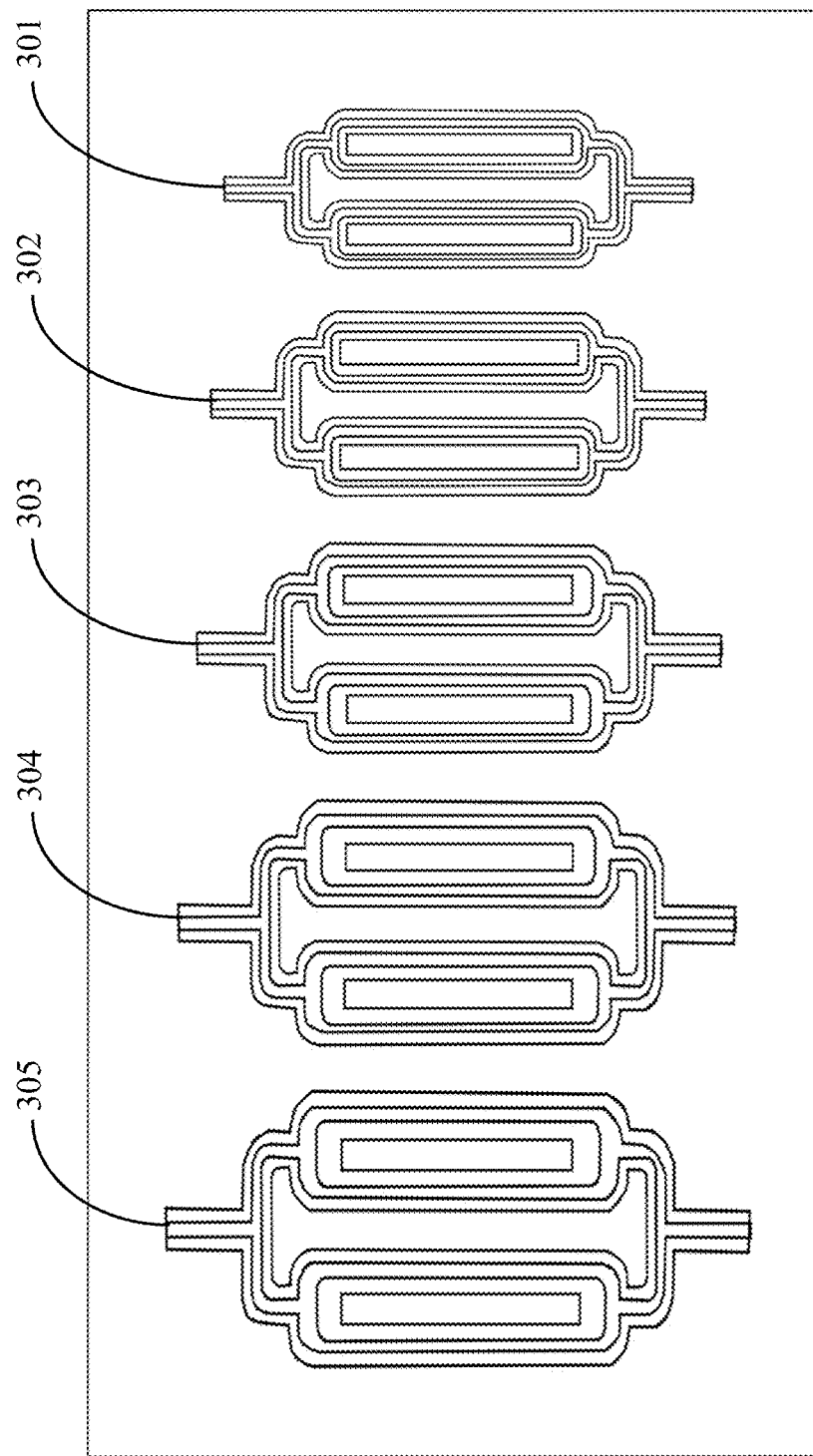

FIGS. 3A and 3B shows a chip design for monolithic high-resolution 3D printed microfluidic device/microbial fuel cell device 300 on an OBJET500 3D printer according to an exemplary embodiment of this disclosure, where FIG. 3B provides a more detailed view of the microfluidic/conductive channels.

The chip design shown includes 5 differently sized T channels, 301, 302, 303, 304 and 305 which produce an array and was produced for evaluation purposes. As shown, each T channel includes a top inlet port 311, 312, 313, 314 and 315, respectively, and a bottom outlet port 321, 322, 323, 324, 325, respectively.

Figure 4:
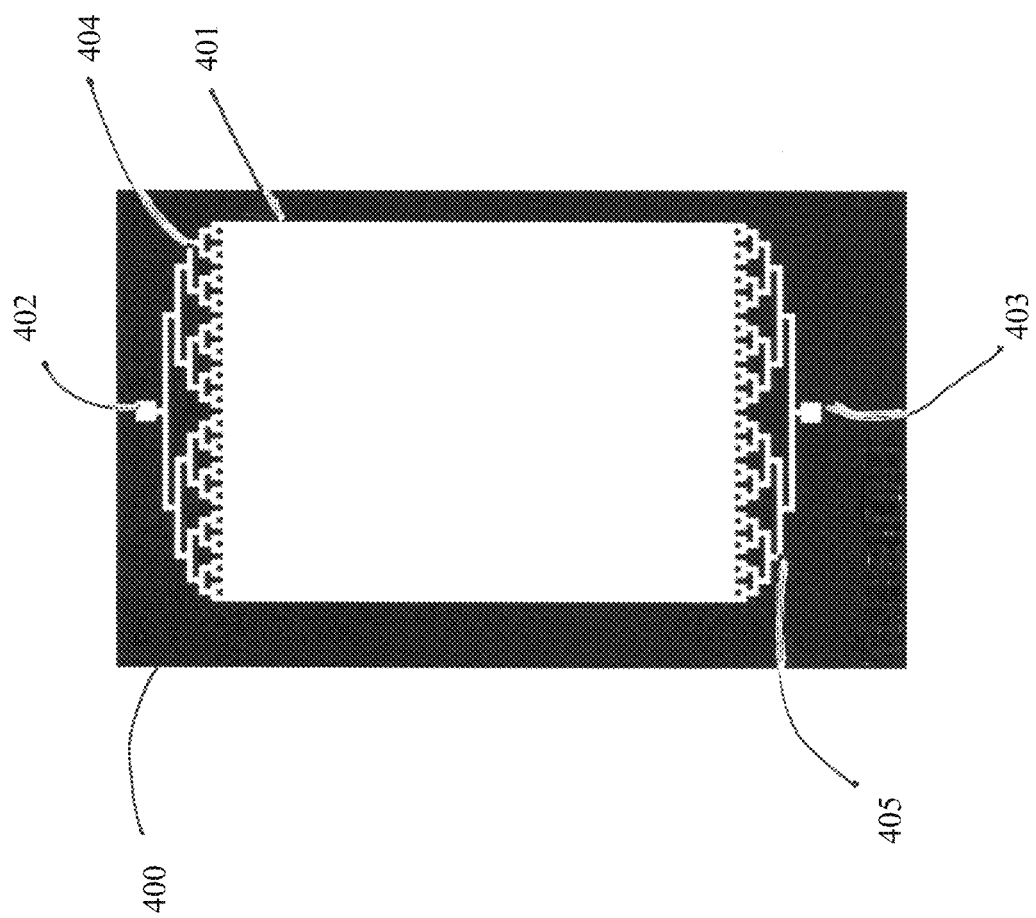
FIG. 4 show microchannel interconnection mold patterns associated with a chip design for a monolithic high-resolution 3D, where each T channel top wide section is operatively connected to multiple narrow sections sharing a common channel associated with the top wide section and eventually all T channel top wide sections eventually connect to a top fluidic inlet port on one end of the device and a bottom fluidic outlet port on the opposite end of the device.

FIG. 4 show microchannel interconnection mold patterns associated with a chip design for a monolithic high-resolution 3D, where each T channel top wide section is operatively connected to multiple narrow sections 404 and 405 sharing a common channel associated with the top wide section and eventually all T channel top wide sections eventually connect to a top fluidic inlet port 402 on one end of the device and a bottom fluidic outlet port 403 on the opposite end of the device.

Cavity 401 comprises a plurality of input and output microchannels (not shown) to be filled with media-carrying bacterial cells prior to placing the chips under water. These media-carrying bacterial cells act as a priming solution ahead of placing the chips in a benthic environment.

Turning back to FIG. 4, a first and second opening 403 and 404 respectively, allow for a priming solution to be piped into the chip. First and second openings 403 and 404 also allow for an exchange with the surrounding environment once single-layer microfluidic chip 400 is buried under water.

Figure 5A:
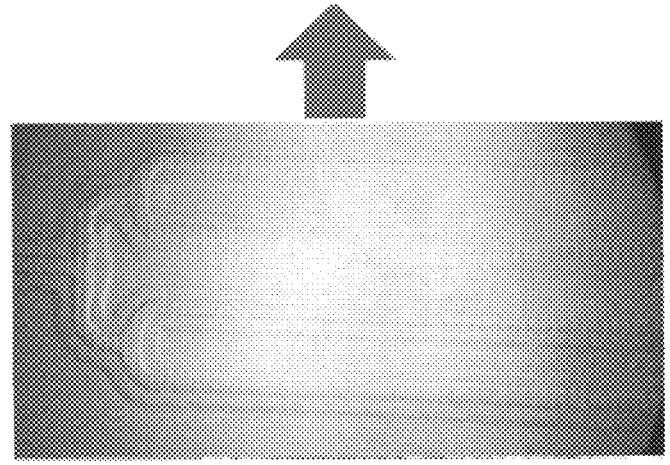
FIGS. 5A-5D show a clearing process, where
Figure 5B:
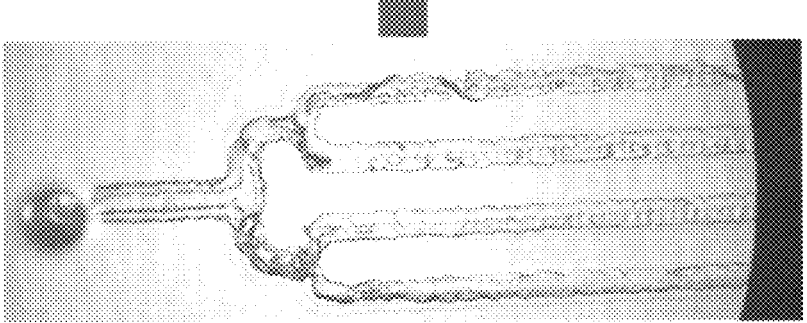
Figure 5C:
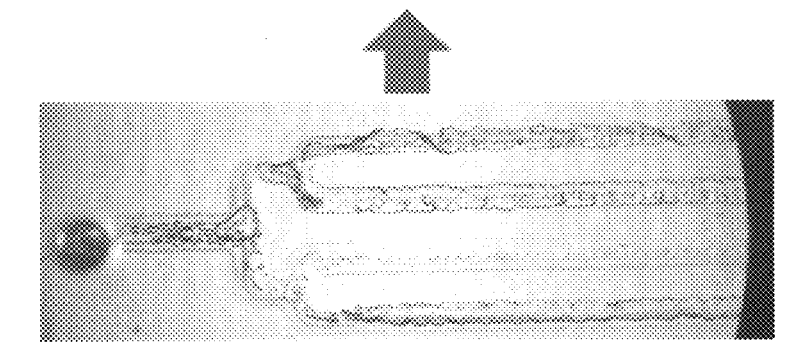
Figure 5D:
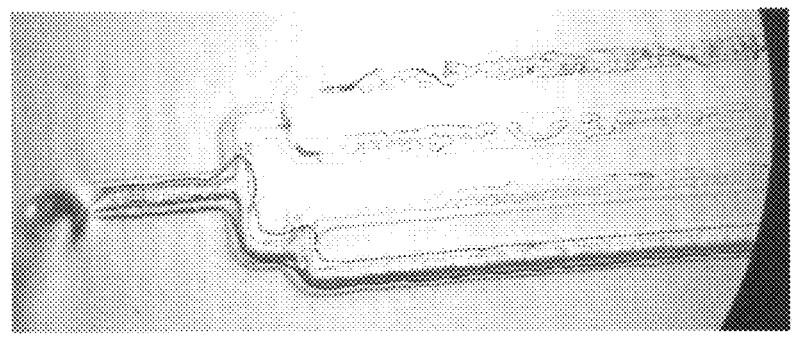

FIGS. 5A-5D show a T channel top wide section clearing process, where FIG. 5A shows a 3D printed monolithic microbial fuel cell body which was 3D printed using a sacrificial wax to produce the T-channel; FIG. 5B shows the microbial fuel cell body during a sacrificial wax melt step; FIG. 5C shows the microbial fuel cell body during a bleaching step using 2% NaOH; and FIG. 5D shows the microbial fuel cell body after an air flush step.

Notably, during this clearing process, as shown in FIG. 5D, only the left 2 channels appear cleared due to a shunting effect. As the process is scaled to include an array of T channels fluidically interconnected, this shunting effect will not restrict the clearing of channels due to shunting.

FIGS. 6A-6D show an example of a power cube 602 with a microfabricated array 601 of microbacterial fuel cell chips according to an exemplary embodiment of this disclosure.

Microbacterial fuel cell chips are acting as microelectrodes. Microfluidic chips combine microfluidic control and cell housing with microfabricated arrays 601 of microelectrodes for charge capture. Higher cell density in principle should produce higher power output, but beyond a certain concentration, the system might experience diminishing returns and perhaps even a decrease in output power. Overcrowded living space, excessive waste generation, and hydrogen production due to electron loss may interfere with optimal metabolic processes for the bacteria.

Figure 6A:
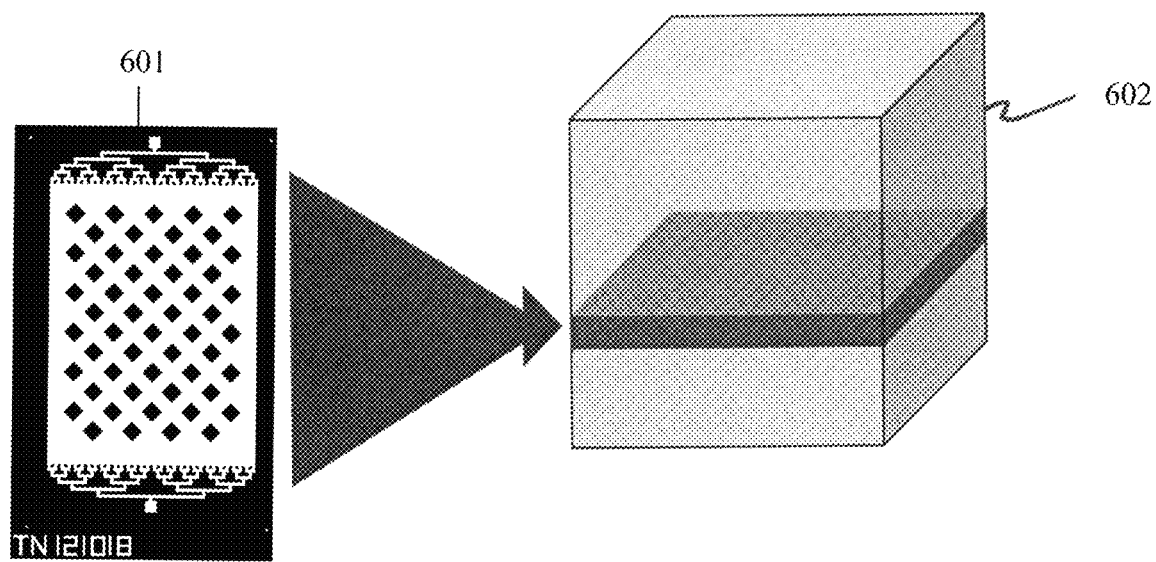
FIGS. 6A-6D show an example of a three-dimensional power cube including arrayed microfluidic microbacterial fuel cell chips according to an exemplary embodiment of this disclosure, and a superarray of three-dimensional power cubes according to an exemplary embodiment of this disclosure.
Figure 6B:
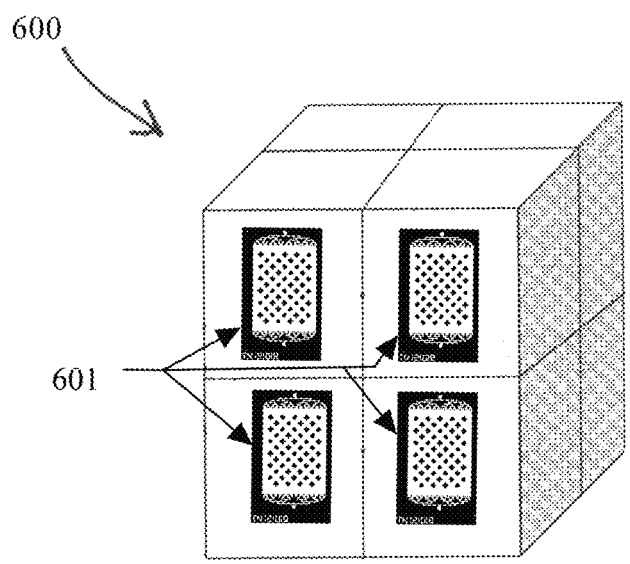

As shown in FIG. 6B, a plurality power cubes 602 are arrayed into a superarrayed power cube 600.

Figure 6C:
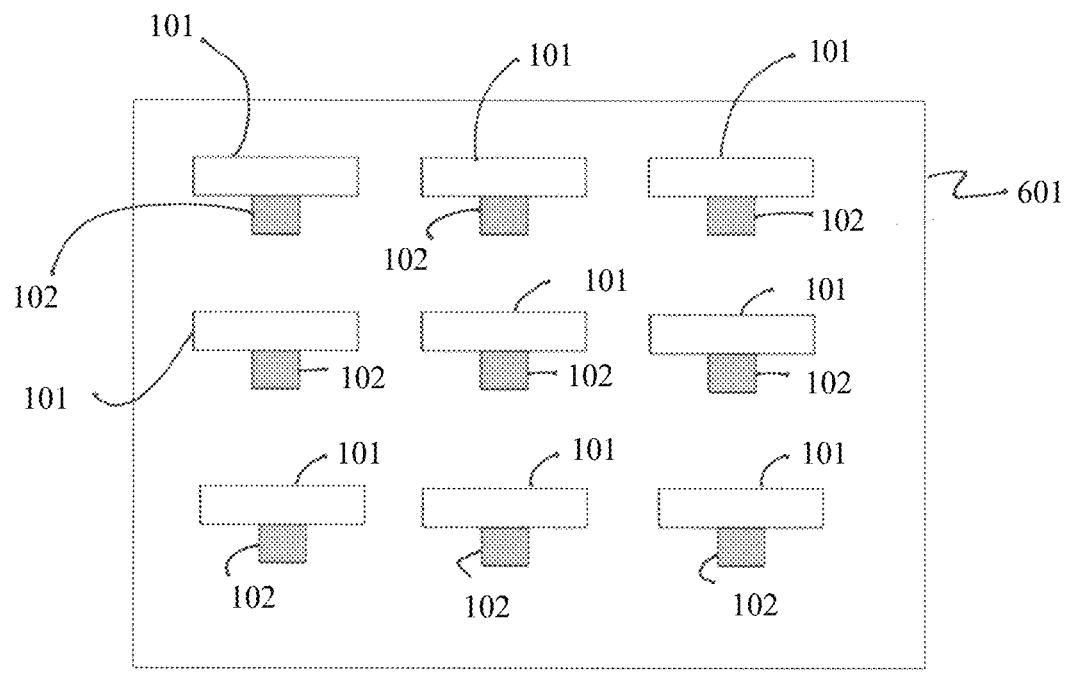
Figure 6D:
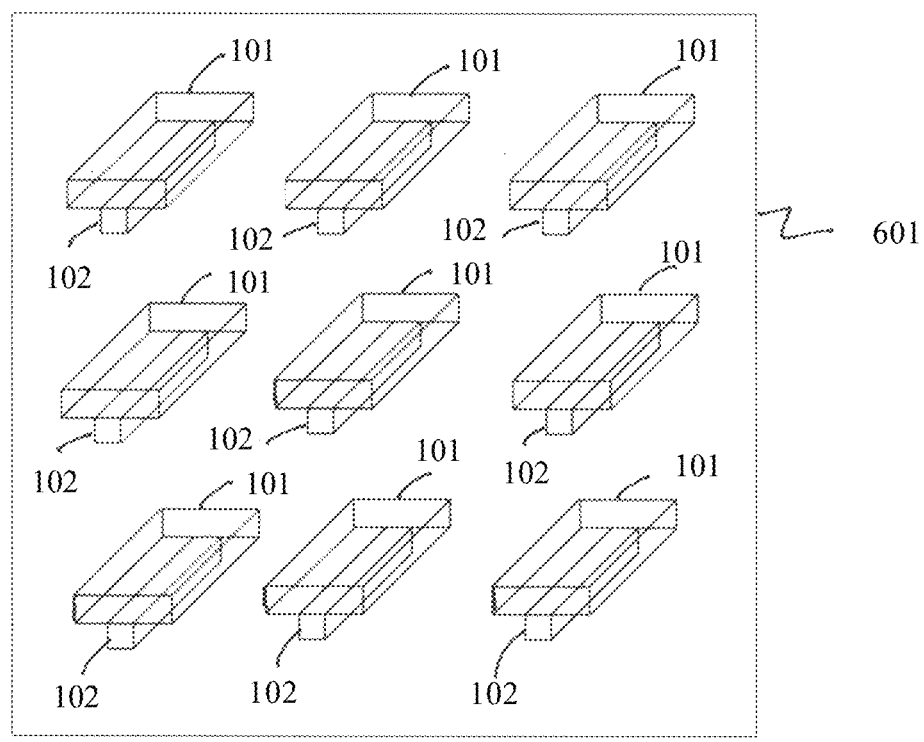

As shown in FIGS. 6C and 6D, the microfabricated arrays 601 include a plurality of T channel microfluidic devices, i.e., fuel cells in this example, which are monolithically 3D printed as an array.

By way of example and to illustrate the importance and value in stacking or 3D printing devices, a device outputting 100 mW/m$^2$ can produce a power cube of 1 m$^3$ size that outputs 1 kW of power. Using a 3D printed device devices significantly improve the manufacturability and power output of such devices, as well as 2D architectures being arrayed in 3D. While 2D stacked arrayed architectures of devices can provide this increase in power, 3D printed arrayed devices or some other 3D modular manufacturing process are more economically practical. Extending the use of stacked/or 3D/modular manufacturing can produce 3D arrays superarrayed into 3D arrays of arrays.

The potential uses of power cube 602 are extensive. For example, power cube 602 or arrayed power cubes 600 can be easily used as a standardized test station to optimize system parameters such as cell concentration, media content, microelectrode scaling, and fluidic architecture, all towards maximizing output power density. Power cube 602 or arrayed power cubes 600 could power small sensors or any other device that requires power. Power cube 602 or arrayed power cubes 600 could be used to power acoustic sensor tags for marine mammals. Also, food sources can be included in future chip production as supplemental feeding has been demonstrated to increase power production. In addition, energy harvesting strategies can be included to optimize a charge and discharge cycle for increased power.

Such optimizations will generate phase space diagrams of power versus those parameters. These diagrams would be used to build theoretical models about those functional dependences. The models would be tested against the already collected experimental data. Confirmed models would provide better understanding of the biology and physiology of the microbes, from the viewpoint of their use in renewable power applications. That new basic knowledge would then suggest new areas in parameter space for power applications, leading to further experimental optimizations and improved output power density.

Furthermore, parametric optimization would suggest the best geometry and composition of a "unit" power cell, including size and scaling. That unit can then be superarrayed to produce larger systems with proportionally larger power output and would ultimately enable the manufacture of automated power stations offering renewable energy for the refueling of swarms of drones.

Figure 7:
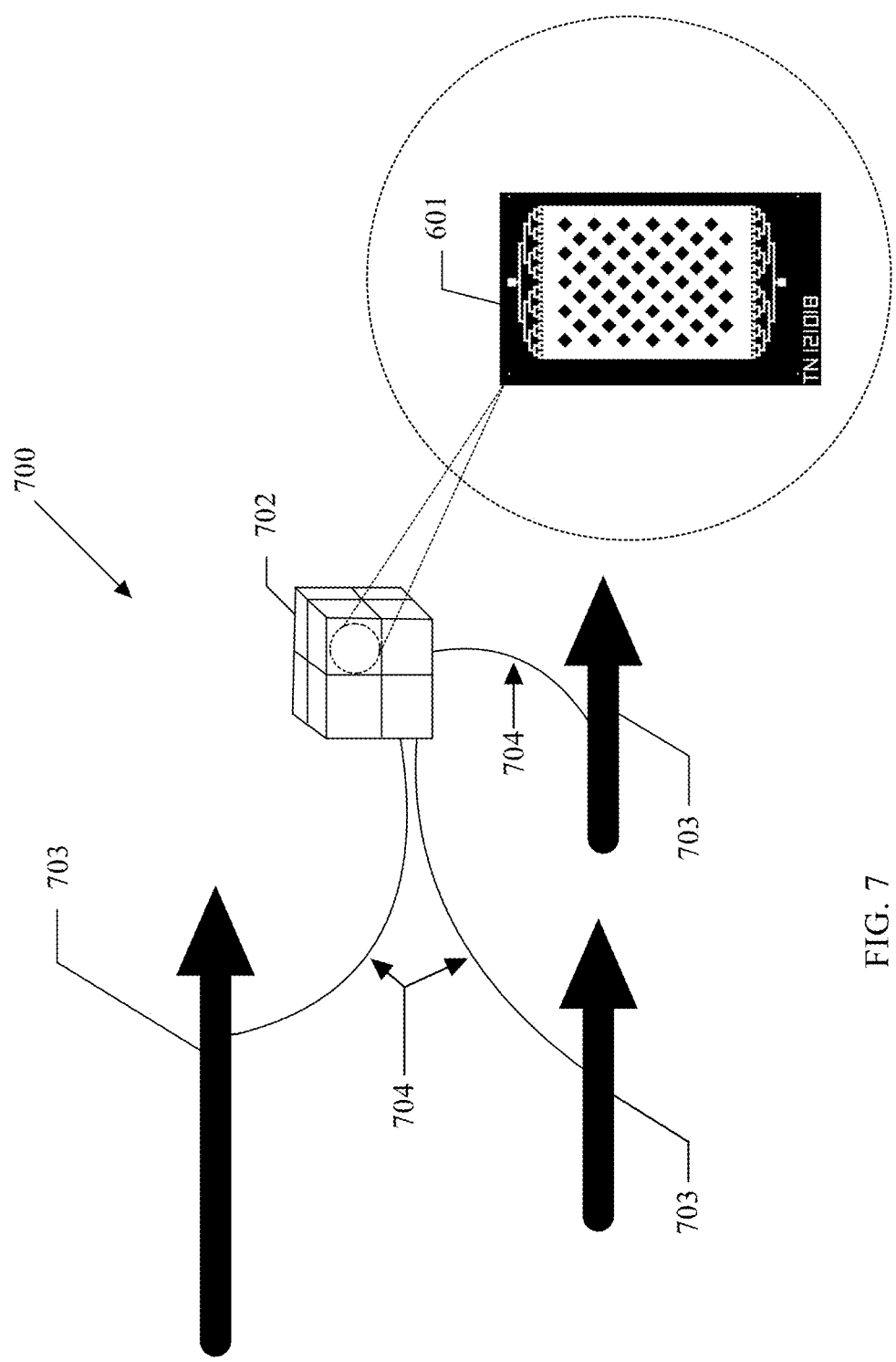
FIG. 7 shows an example of a three-dimensional power cube including arrayed microfluidic microbacterial fuel cell chips as part of a system to power an unmanned vehicle.

FIG. 7 shows an illustration of a system 700 whereby a plurality of microbacterial fuel cell chips 601 is arrayed into a three-dimensional-configured power cube 702 and used to power an unmanned unwater vehicle (UUV) 703. In system 700, power cube 702 is electrically connected to UUV 703 with a power cord 704, diverting electron generation to charge UUV 703.

Figure 8:
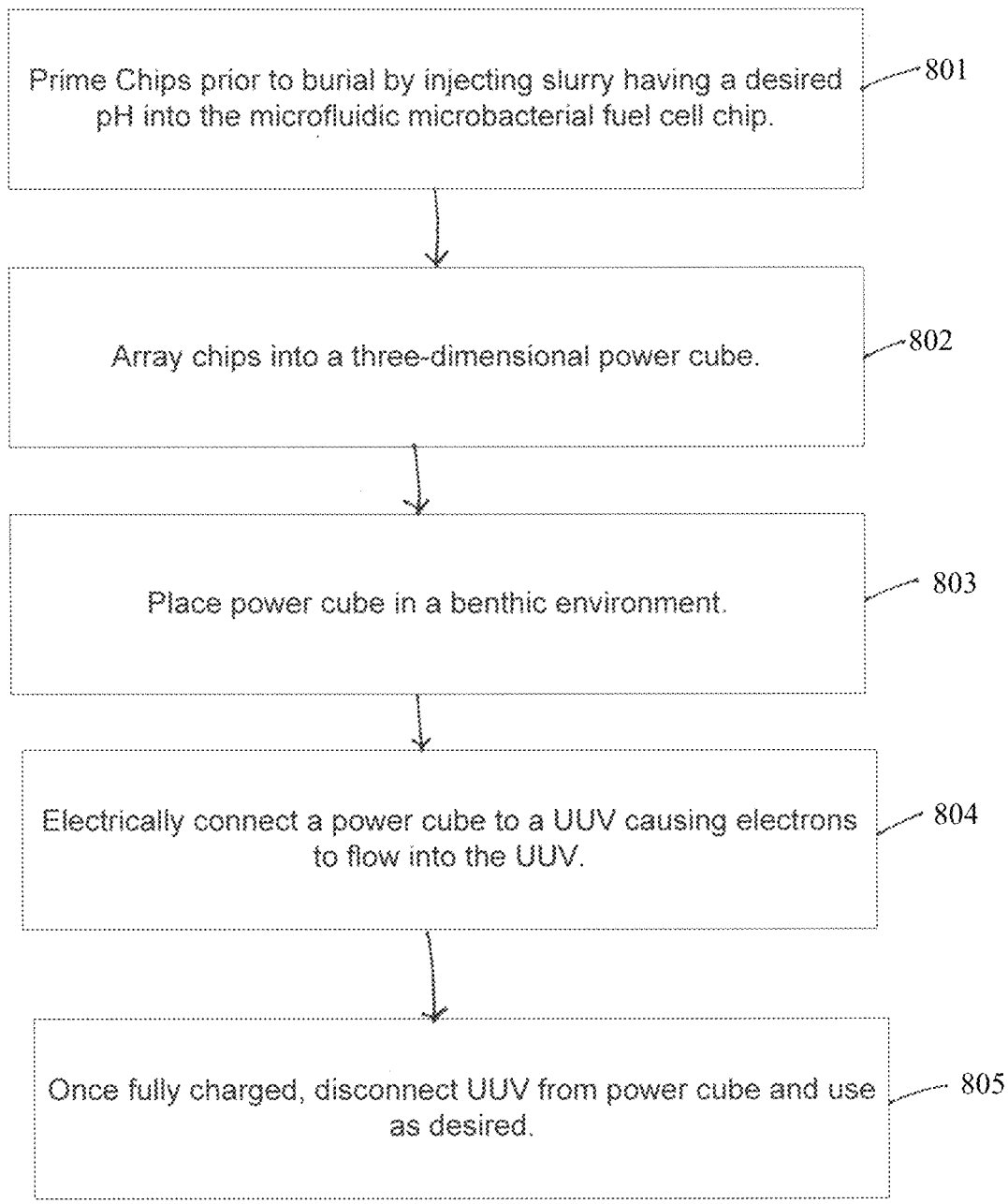
FIG. 8 shows a flow chart depicting steps for utilizing a microbacterial fuel cell chip to power a system according to an exemplary embodiment of this discloure.

FIG. 8 shows a flow chart of a method demonstrating steps in which to use system 700.

At step 801, microbacterial fuel cell chips are primed prior to burial by injecting a microbial slurry having a desired pH into the microfluidic microbacterial fuel cell chip.

At step 802, chips are arrayed into a three-dimensional power cube.

At step 803, the power cube is placed in a benthic environment.

At step 804, a UUV is electrically connected to a power cube, thereby causing electrons to flow into the UUV.

At step 805, once the UUV is fully charged, the UUV is disconnected from power cube and use as desired.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A microfluidic device structure comprising:
   a microfluidic device body;
   a plurality of channels within the microfluidic device body, wherein each channel has a T-shaped cross-section, each channel comprising a top wide section and a bottom narrow section, the top wide section associated with the top of the T-shaped cross section and the bottom narrow section associated with the bottom of the T-shaped cross section, wherein the top wide section has less fluidic resistance relative to a fluidic resistance of the bottom narrow section;
   wherein the top wide section is configured for passing aqueous fluid flow and the bottom narrow section is configured to have a hydrophobic fluid remain, and the bottom narrow section is configured to capture electrons from the passing aqueous fluid flow to provide a power output;

a fluidic inlet operatively associated with the microfluidic device body and the plurality of channels; and a fluidic outlet operatively associated with the microfluidic device body and the plurality of channels.

2. The microfluidic device structure according to claim 1, wherein the microfluidic device body is a monolithic 3D printed device.

3. The microfluidic device structure according to claim 1, wherein the plurality of channels is filled based on surface tension and self-assembly, and the bottom narrow section of each channel is filled with first material, and the top wide section of each channel is filled with a second material distinct from the first material.

4. The microfluidic device structure according to claim 3, wherein the microfluidic device body material is a hydrophobic material, the bottom narrow section material is a hydrophobic material, and the top wide section material is a hydrophilic material.

5. The microfluidic device structure according to claim 1, wherein a second microfluidic structure configuration is produced by flowing the hydrophobic fluid through the plurality of channels until they are filled, then flowing a hydrophilic fluid through the plurality of filled channels until the hydrophobic fluid within top wide sections is replaced with the hydrophilic fluid and bottom narrow sections remain filled with the hydrophobic fluid.

6. The microfluidic device structure according to claim 5, wherein the hydrophilic fluid is removed or evaporated to produce a third and final microfluidic structure configuration, wherein the bottom narrow sections are filled with the hydrophobic fluid while the top wide sections are empty.

7. The microfluidic device structure according to claim 5, wherein the bottom narrow sections in the final configuration are filled with hydrophobic conducting fluid or conducting gel, and the top wide sections are filled with one of a hydrophilic fluid and a gas, or are empty.

8. The microfluidic device structure according to claim 5, wherein the final configuration of the microfluidic device structure is used to transfer electrical charge from a working fluid passed through the top wide section to the conducting fluid or gel in the bottom narrow section which act as a capture electrode, and the conducting fluid or gel serves to transfer the electrical charge to an external device.

9. The microfluidic device structure according to claim 8, wherein the working fluid is a feed solution including salt water or food medium containing microbacteria, and the conducting fluid captures electrical charge emitted by the microbacteria and conducts the electrical charge to the external device.

10. The microfluidic device structure according to claim 1, wherein each top wide section is operatively connected to multiple narrow sections sharing a common channel associated with the top wide section.

11. The microfluidic device structure according to claim 1, wherein the hydrophobic fluid is a gel configured to solidify.

12. A microbial fuel cell device comprising:
a monolithic 3D printed microfluidic device body;
a plurality of channels within the microfluidic device body, wherein each channel has a T-shaped cross-section, each channel including a top wide section and a bottom narrow section, the top wide section associated with the top of the T-shaped cross section and the bottom narrow section associated with the bottom of the T-shaped cross section, wherein the top wide section has less fluidic resistance relative to a fluidic resistance of the bottom narrow section, wherein the top wide section is configured for passing aqueous fluid flow, and wherein the bottom narrow section is filled with a conducting fluid or gel and the bottom narrow section is configured to capture electrons from the passing aqueous fluid flow to provide a power output;
a fluidic inlet operatively associated with the microfluidic device body and the plurality of channels; and
a fluidic outlet operatively associated with the microfluidic device body and the plurality of channels.

13. The microbial fuel cell device according to claim 12, wherein a second microfluidic structure configuration is produced by flowing a hydrophobic fluid through the plurality of channels until they are filled, then flowing a hydrophilic fluid through the plurality of filled channels until the hydrophobic fluid within top wide sections is replaced with the hydrophilic fluid and bottom narrow sections remain filled with the hydrophobic fluid, and wherein the hydrophilic fluid is removed or evaporated to produce a third and final microfluidic structure configuration, wherein the bottom narrow sections are filled with the hydrophobic fluid while the top wide sections are empty.

14. The microbial fuel cell device according to claim 12, wherein the microbial fuel cell device is produced by flowing a hydrophobic fluid through the plurality of channels until they are filled, then flowing a hydrophilic fluid through the plurality of filled channels until the hydrophobic fluid within top wide sections is replaced with the hydrophilic fluid and bottom narrow sections remain filled with the hydrophobic fluid, and wherein the hydrophilic fluid is removed or evaporated to produce a final microfluidic structure configuration, wherein the bottom narrow sections are filled with the hydrophobic fluid while the top wide sections are empty.

15. The microbial fuel cell device according to claim 12, wherein the monolithic 3D printed microfluidic device is operatively associated with an array of microbial fuel cell devices which are configured as a 3D power cube.

16. The microbial fuel cell device according to claim 15, wherein a plurality of arrayed microbial fuel cell devices configured as 3D power cube are arrayed into a superarray of 3D power cubes.

17. The microbial fuel cell device according to claim 12, wherein the bottom narrow section is configured as an electrical conducting channel.

18. The microbial fuel cell device according to claim 17, further configured with multiple electrical conducting channels and wherein the multiple electrical conducting channels are associated with the top wide section.

* * * * *